US005571971A

United States Patent [19]

Chastel et al.

[11] Patent Number: 5,571,971

[45] Date of Patent: Nov. 5, 1996

[54] METHOD FOR MONITORING AND CONTROLLING STRESS IN A THREADED MEMBER

[75] Inventors: Jean-Marc Chastel, Sauzet; Didier Rey, Saint Georges les Bains, both of France

[73] Assignee: Ciandar, Saint Georges les Bains, France

[21] Appl. No.: 481,430

[22] PCT Filed: Dec. 16, 1992

[86] PCT No.: PCT/FR92/01192

§ 371 Date: Jun. 15, 1995

§ 102(e) Date: Jun. 15, 1995

[87] PCT Pub. No.: WO94/13437

PCT Pub. Date: Jun. 23, 1994

[51] Int. Cl.[6] .......... G01L 5/24

[52] U.S. Cl. .......... 73/761

[58] Field of Search .......... 73/761

[56] References Cited

U.S. PATENT DOCUMENTS

| | | | |
|---|---|---|---|
| 3,969,810 | 7/1976 | Pagano | 73/761 |
| 4,016,938 | 4/1977 | Rice | 73/761 |
| 4,037,282 | 7/1977 | Dahl | 73/99 |
| 4,142,266 | 3/1979 | Dahl | 73/761 |
| 4,185,504 | 1/1980 | Exner et al. | 73/761 |
| 4,488,437 | 12/1984 | Pere | 73/761 |

*Primary Examiner*—Richard Chilcot
*Assistant Examiner*—Max Noori
*Attorney, Agent, or Firm*—Herbert Dubno; Andrew Wilford

[57] ABSTRACT

The tensile or compressive stress in a threaded member is determined by subtracting an unscrewing torque from a screwing torque, and dividing the resulting torque difference by a coefficient proportional to the screw pitch of the member. The torque values are recorded either statically at the screwing and unscrewing rest limit, or dynamically in a series of corresponding screwing and unscrewing positions. The method is particularly useful for measuring, monitoring and controlling stress in threaded fastening members used in screwed joints.

9 Claims, 3 Drawing Sheets

METHOD FOR MONITORING AND CONTROLLING STRESS IN A THREADED MEMBER

CROSS REFERENCE TO RELATED APPLICATIONS

This application is the U.S. national phase of PCT application PCT/FR92/01192 filed 16 Dec. 1992.

FIELD OF THE INVENTION

The invention relates to a method of monitoring and controlling the screws in a threaded element such as a screw, bolt, nut or other threaded mounting element mainly but not exclusively used in the screwed assemblies.

BACKGROUND OF THE INVENTION

The automotive, aeronautical, aerospatial, nuclear and other mechanical manufacturing industries generally use screwed assemblies and this in applications that are extremely varied and complex.

The calculation notes for screwed assemblies are aimed at determining the prestress to apply to the assembly as a function of the useful stress (or service stress) to which the assembly will be subjected when used and of a tightening factor depending on the precision of the means for applying this prestress.

These calculation notes done by engineers studying in these industries are very precise as a function of the defined needs and the conditions of use of the screwed assemblies are more and more severe so that it is getting essential to increase the reliability of these assemblies while respecting the calculation notes in their execution so as to increase the performances and the safety of the systems thus made.

The stress to apply in a threaded mounting element is generally created by conversion of a rotation force into a tractive force by the helicoidal path of the thread of the element. This conversion is imperfect mainly because of the losses from friction of the surfaces in contact; hence it is necessary to apply a rotation force (torque) greater than the rotation force necessary for this conversion.

The efficiency of this conversion is extremely varied because of the variation of the coefficients of friction, the variation of the distance to which the resultant of the friction forces are applied relative to the axis of rotation, and the geometric variation of the parts, mainly the contacting surfaces. Practical observations give a variation of 50% of the induced stress during application of a constant torque on the same lot of mounting elements. It is verified that the improvement of the precision of the applied torque does not bring about a significant improvement in the precision of the tension measured.

A first improvement of the variation of the stress generated by the torque has been associated with the rotation angle starting from a predetermined torque. In effect the lengthening of the mounting element which creates the tension is proportional to the rotation angle. This proportion should be determined in advance because it is dependent on the assembly and not on the mounting element. The dispersion of the stress is improved in particular conditions due to the earlier trials and the geometric specifications of the engaging pieces which can be expensive. In addition the danger of entering into the plastic zone is not excluded because of the variability of the starting point of the measurement of the angle, in theory called prestress torque. It is to be noted that the prestress torque can be an accidental couple, for example from crossthreading; in this case the tension is far from being created.

Starting from the combination of these two measurements of torque and angle a tightening principle has been worked out: the permanent monitoring during the application of the torque of the variation of the gradient of the torque as a function of the angular advance allows one to establish an identifiable point of the function torque/angle, called the point of the elastic limit. This method puts the screw into a state of constraint (or of prestress) which uses all of the prestress possible of the assembly to the detriment of the service load. An advance determination of the tension is done in order to integrate the variations of section and the resistance to traction of the materials forming the mounting element. This method is very sensitive to the reaction forces of the means that apply the torque; for example flexion of the machine base, slipping of the holder of the assembled element. The point of the elastic limit can be that of the first element that breaks in the chain of mechanical action and reaction. In order to be applied with a maximum of safety, this method requires extra precautions that are expensive. This method offers a precision of ±10% in the tension of a single point using the entire capacity of the mounting element for the prestressing. The major disadvantage of this method is the penetration, even minimal, into the plastic zone of the mounting element. The trials of controlling and/or of monitoring of the slope (factor director of the tangent to the curve) at any point of the elastic zone are shown to be imprecise and varied. In this case one adds up the dispersion of the torque due to friction and the dispersion of the angle due to the flexibility of the assembly.

In order to eliminate variations of the stress due to diverse variations as discussed above, a new approach to tightening under stress is created by the ultrasound method.

This method is based on the variation of the time it takes traveling sound to move uniquely in the interior of the mounting element and it has nothing to do with all the other parameters not related to the element as well as the variations of the thickness of the pieces engaged together. The variation of the travel time is in theory directly related to lengthening. The relation of tension/lengthening is tied to the strength of the material, to its section, and to its starting length. This purely comparative method requires modelling (a specimen element) of the mounting element that will be tested for determining the variation of a travel time specific to a given stress. The measured lengthening is only a small part of the real length of the mounting element. In effect when one is working with the propagation of sound, only the stressed part of the mounting element takes part in the lengthening. This stressed part depends on the thickness of the engaged parts. Machining tolerances reflect directly on the elongation seen. The mounting element enters into these geometric dimensions mainly for the total variation of the travel time which depends on the length of the element relative to its stressed part. This variation is reflected in the travel time and in the variation in the ratio of length stressed to total length. In addition the parallelism of the planes of reflection of ultrasonic waves (essentially for a screw the head and the base of the stem) intervene directly in the effective position of the device measuring the travel time. The measurement of the lengthening should be done during the tensioning of the element because repositioning introduces errors that can double the degree of imprecision of the ultrasound method. Altogether these tolerances can be mastered with considerable expense; the precision of the effective measure of stress is similar to that of the elastic limit with the advantage of being able to be located anywhere of the admissible load of the mounting element with nonetheless the inconvenience of only being a probable indication of tension taking into account the reference to a sample (theoretical model) that is part of the average treatment of a lot of mounting elements.

The conditions of use of this method require important precautions with respect to connection of the measuring device, lack of markings on the head of the mounting element, actual temperature at which the measurement is taken, cleanness of the measurement surfaces, etc, precautions that entail high use costs and limited production speed. The cost of the ultrasound measuring device is itself very high, and this method can only be used in particular circumstances where the costs and the production rates are not a problem. This method is often retained as a means for monitoring or determining the conventional parameters of screwing (torque and angle).

In summary, none of the above-discussed methods provides a direct measurement of the tension, they are either comparative or theoretical and normally require advance trials to adjust the parameters and to know how the assembly will react. There is always at least one parameter that varies from one threaded element to another and which because of this creates a certain incertitude in the tension revealed:

Torque method: extreme variation in stress, stress unknown;

Method using the angle: limited variation of the tension, advance estimated stress;

Method using the elastic limit: One point of tension at the maximum of the capacity of the screw, Tension estimated in advance, The environment must be controlled;

Ultrasound method: One point of stress and one point somewhere on the capacity of the mounting element, Tension estimated in advance, The machining tolerances and geometry must be controlled, Use limited by price.

The more efforts are made to precisely estimate the stress, the more the apparatus for the procedures costs and the more the procedures cost to do and use. Having to end up with an estimate rather than a direct measurement brings with it further monitoring costs. Industrial requirements concerning the new methods clearly indicate the inadequacy of the current ones.

Knowing that the methods described above all have one or more inadequacies, a new method has been proposed based on the study of several hundreds of screw connections and all sorts of mounting elements of the difference between the torque level applied during screwing-in and the torque value applied during screwing-out, which leads to the simplest of applying stress in order to discover the energy relationships between the torque and the energy of the screw assembly to arrive at a new process.

In effect the screwed assembly is formed of elastic materials. From this it therefore acts like a spring. Stretching this spring in its elastic range by means of a force Ft stores in this screwed assembly an energy E which can be expressed as follows:

$$E=(Ft\ \delta L)/2 \quad (1)$$

where δL is the difference between the final length and the starting length of the mounting element.

This accumulated energy (1) is recovered during screwing-out because of the reversibility of the mounting element because of its helicoidal thread and the potential energy residing in the screwed assembly.

If this lengthening is done by converting a torque Cu into a tractive force by means of a helicoidal ramp of angle α developed on a circumference of diameter 2·r, this expression becomes:

$$E=(Cu\cdot \cot\alpha/r)\cdot(\delta L/2) \text{ with } \cot\alpha=2\,\pi r/P$$

$$P \text{ being the pitch of the screwthread so that } E=Cu\cdot\delta L\cdot\pi/P \quad (2)$$

This stored energy is not apparent and only represents a fraction of the applied energy because of the energy consumed by friction which mainly impedes spontaneous screwing-out of the mounting element. This friction is the same during screwing-in and screwing-out and is created by the parts of the contact surfaces of the different elements forming the assembly. From this fact it can be seen that there is a difference between the energy applied during screwing-in and screwing-out due to the energy that is stored up during screwing-in and recovered with screwing-out when the energy consumed by friction is constant.

The general distribution of the different energies for an energy applied are described as follows:

$$\text{during screwing-in } Eapp=Et\,fr+Ett+Eflt+Etg$$

$$\text{during screwing-out } -Eapp'=Et\,fr-Ett-Eflt-Etg \text{ hence } Etfr=(Eapp-Eapp')/2 \quad (3)$$

wherein

Eapp=energy applied to the mounting element on screwing-in

Eapp'=energy applied to the mounting element on screwing-out,

Etfr=energy converted into tension of the mounting element,

Ett=energy consumed by the head or nut of the mounting element,

Eflt=energy consumed by friction of the thread of the mounting element,

Etg=energy consumed by friction of the stem of the mounting element.

In taking the time derivative of equation (3) one gets:

$$d(Etfr)/dt=[d(Eapp)/dt-d(Eapp')/dt]/2 \text{ at time } t\ Ptfr=(Papp-Papp')/2 \quad (4)$$

wherein

Papp=power applied for screwing-in,

Papp'=power applied for screwing-out,

Ptfr=power converted into stress and taking account of the generally relationship Pu=C. (power=torque×rotation speed) equation (4) simplifies to $$Cu=(Capp-Capp')/2 \quad (5)$$

The useful torque or torque transformed into tension Cu can be described according to (2) as a function of the converted energy as follows:

$$Cu=Etfr\cdot P/(\pi\cdot\delta L)$$

inserting (1) one gets:

$$Cu=FT\cdot P/(2\pi)$$

wherein

Capp=torque applied for screwing-in

Capp'=torque applied for screwing-out and reciprocally $$Ft=(capp-capp')/(P/\pi) \quad (7)$$

In other words, the stress force (in traction or compression) can be monitored as a function proportional to the difference between the torque applied on screwing-in, especially the maximum torque at the stopping point, and the torque applied on screwing-out, especially the maximum screwing-out torque, the difference being divided by (P/π), a quantity proportional to the pitch of the screwthread. The quantity (P/π) constitutes a constant for a given thread which allows the immediate conversion of the difference between the torques of the act of screwing-in then of screwing-out a threaded mounting element, expressed in Newton-meters (Nm) and a stress expressed in Newtons (N) whose precision is directly derived from the precision of the torques.

From the formula (7) one can deduce the general definition for a method of monitoring and controlling tension or compression of a threaded element in which the tensile or compressive force (Ft) of the threaded element is determined by the action of subtracting the torque applied on screwing-out (Capp') from the torque applied on screwing-in (Capp) and dividing this difference in torques by a factor proportional to the pitch (p) of the screwthread of said element. Such a process is generally and theoretically described by document EP-A-0,096,620.

In any case this document does now show a workable and reliable operational mode for putting this method into industrial use; the teachings of document EP-A-0,096,620 only allow an approximation of the screwing-in force exerted by the threaded element and thus the disadvantages of the other prior-art techniques are not avoided.

More precisely an analysis of document EP-A-0,096,620 allows one to discern, for the process that it describes, on one hand the theoretical insufficiencies and on the other hand the technical insufficiencies.

The mention of a factor of proportionality between the screwing-in force and the difference of the screwing-in/screwing-out torques seen at a particular point based on document EP-A-0,096,620 has several problems:

1. Speculation about the constant of friction (which varies in reality at each point of advancement as a function of the constant area, the condition of the surface, and the contact pressure) because the for the proportionality constant (K). This is friction constant varies it is impossible to predict the final screwing-in torque at a point different from that of the measurement or even less the stress existing at this torque.
2. The screwing-in/screwing-out torques should be measured under particular conditions which are not detailed in the cited document and in the absence of this the measurements vary widely, being able to range to a negative tension ! (ex; a screwing-out torque greater than a screwing-in torque caused by an adherence or gluing). There is an obligation to measure right from the start of the movement of the threaded element and/or to not read torques except at precise times as proposed by the present invention.

The preceding points are confirmed by the content of document EP-A-0,096,620 which admits that the factor K is different for several tries from which there comes the need to evaluate it statistically but which does not resolve the problem of the proportionality of the factor K over all of the screwing-in process. At best one gets an approximation of K at one particular point relative to an angular position.

3. Absence of the notion of correlating positions to the places where the torques are read on screwing-in and screwing out which for a progressive force like the increase in torque and in tension introduces an offset of the supplemental torque which seriously hurts the method (detorqueing of the threaded element).
4. With respect to the modalities of working according to the claims 5 and 6 of document EP-A-0,096,620, introducing the notion of a "gradient," it is to be noted that the way of carrying out the method suffers from the main defects as those described earlier and more that the taking of a derivative increases greatly the anomalies of measurement In addition to the theoretical deficiencies developed above, document EP-A-0,096,620 has no practical description of the means which allow one to apply the theory developed in this document, and its sole figure is limited to the representation of a classical threaded assembly.

In view of this state of the art, the present invention is aimed at furnishing a perfected method while giving a specific operating mode allowing good reproducibility and better precision.

In this method of monitoring and controlling the tension or compression of a threaded element where the tension or compressive force of the threaded element is determined by subtracting the unscrewing torque from the screwing torque and where the difference between these torques is divided by a factor proportional to the pitch of the screwthread of said element, the invention provides that these torque values are measured either statically at the rest limit during screwing-in and screwing-out or dynamically at a succession of corresponding positions during screwing and unscrewing.

Simple means allow one to carry out the method whose general definition was just given, for learning, controlling, or monitoring screw assemblies in an inexpensive and more efficient manner than any of those now known and thus the invention allows one to use threaded mounting element of lesser cost and of lower quality while being certain of the holding of these mounting elements.

A first way of carrying out the method according to the invention consists of applying the process to a measurement of tension by using a manual, mechanical, pneumatic, hydraulic, or electric motor capable via a coupling device connected to the threaded mounting element of the assembly of applying a controlled force for rotating this mounting element.

In the case of negligible mechanical inertia, the method is characterized by the action of screwing in with the aim of taking at the rest limit of sliding of the movable part of the mounting element on the fixed part of the assembly the value of the rotatory force, then by the action of screwing out with the aim of taking, at the rest limit during the sliding of the movable part of the mounting element on the fixed part of the assembly the value of the rotatory force as it goes through its maximum, then of taking the difference between these two force values to divide them by a factor that is mainly proportional to the pitch of the screwthread of the mounting element so as to obtain a value representing in precise limits either:

the tractive force applied to the mounting element, the compressive force exercised by the mounting element, or the tensile force inside the mounting element.

When the motor means i provided with a torque meter the direct relationship is expressed as follows:

$$Ft=(Cv-CD)/k \text{ where } k=P/\pi$$

wherein

Ft=tension force in Newtons

Cv=torque at the limit of screwing-in in Newton-meters

Cd=maximum torque on screwing-out in newton-meters

π=circle constant

P=pitch of the screwthread in meters

The indirect relation is established for the expression of the tension force in another system of measure by a supplementary factor establishing agreement between the units of force and the units of length, for example:

For Ft in Newtons

K=(P/π)·S where S=12, if Cv and CD are expressed in Newton-feet (Nft) and P in inches (in)

where S=1.6584, if CV and CD are expressed in poundal-feet (pdl-ft) and P in inches (in)

When the energy source of the motor is monitored the direct relationship is expressed as follows:

$$Ft=(Ev'-Ed')/K \text{ where } K=P/\tau$$

wherein:

Ft=tension force in Newtons

Ev'=an element representing the energy at the limit of screwing-in

Ed'=an element representing the maximum screwing-out energy

τ=a constant including the π circle constant times the motor efficiency for the type of energy P=the pitch of the screwthread in meters The element representing the energy can be any element giving the image of the torque of the motor means (current, voltage, pressure, etc.) multiplied by a constant or function f(x), but also the torque of a mechanical means using the flexion or the torsion of an element for which the conversion is not generally a constant but can also be a function (x).

In the case of significant mechanical inertia the process is characterized by the action of screwing-in while intending to obtain just as the movable part of the mounting element starts to slide on the fixed part of the assembly ,the value of the rotation force and then of obtaining at the rest limit of the sliding of the movable part of the mounting element on the fixed part of the assembly the value of the rotation force, then dividing so as to obtain at the rest limit during the sliding of the movable part of the mounting element on the fixed part of the assembly the value of the rotation effort as it goes through its maximum, then of taking the difference of these two force values to divide this result by a factor mainly proportional to the pitch of the screwthread of the mounting element so as to obtain a value representing these precise limits either:

the tractive force applied to the mounting element, the compressive force exercised by the mounting element, or the tensile force inside the mounting element at the start of the operation.

When the motor means is provided with a torque meter, the directly relationship is expressed as follows:

$$Ft=(Cv-Cd)\cdot I/K \text{ where } k=P/\pi \text{ and } I=Cg/Cv$$

wherein:

Ft=tension force in Newtons

Cg=torque at the start of screwing-in in Newton-meters

Cv=torque at the limit of screwing-in in Newton-meters

Cd=maximum torque on screwing-out in Newton-meters

π=circle constant

P=pitch of the screwthread in meters

The indirect relationship is established for the expression of the tension force in another system of measure by a supplementary factor establishing agreement between the units of force and the units of length.

When the energy source of the motor means is monitored, the direct relationship is expressed as follows:

$$Ft=(Ev'-Ed')I/K \text{ where } K=P/\tau \text{ and } I=Eg'/Ev'$$

wherein:

Ft=tension force in Newtons

Eg'=an element representing the energy at the start of screwing-in

Ev'=an element representing the energy at the limit of screwing in

Ed'=an element representing the maximum screwing-out energy

τ=a constant including the π circle constant times the motor efficiency for the type of energy P=the pitch of the screwthread in meters The element representing the energy can be any element giving the image of the torque of the motor means (current, voltage, pressure, etc.) multiplied by a constant or function f(x), butalso the torque of a mechanical means using the flexion or the torsion of an element for which the conversion is not generally a constant but can also be a function (x).

The indirect relation is established for the expression of the tension force in another system of measure by a supplementary factor establishing agreement between the units of force and the units of distance.

A nondestructive monitoring of the assembly is done by the action described above of measuring tension followed by the action of rescrewing-in up to the force first used, more specifically either to the rest limit if there is no inertia, or to the start of sliding if there is inertia in order to restore the initial conditions of the assembly while having monitored the existing tensile force in the mounting element or the tractive force to which the mounting element is subjected or even the compressive force exerted by the mounting element.

According to a mode of carrying out the process according to the invention one carries out a simple control by successive approximations (iterative process). To this end on a mounting element that is already stressed in the known manner one exerts the above-defined action as many times as necessary until the ratio of the necessary tensile force to the existing tensile force is equal to 1. In order to limit the amplitude of the screwing-in/screwing-out, the value of the screwing-in/screwing-out force can be modified by a factor (lessening) able to assure the convergence of the action toward the tension necessary in a number of strokes defined by the precision defined in the control of the action.

One can furthermore according to the invention carry out a "dynamic control" by using a manual, mechanical, pneumatic, hydraulic, or electric motor means capable via a coupling member connected to the threaded mounting element of insuring a controlled rotation force and detection of the actual angular position of the mounting element.

With the mounting element not tightened one tightens the mounting element while at regular intervals spaced according to the desired precision and corresponding to respective angular positions one ascertains the force applied and then one loosens the mounting element while at the same positions one determines the force applied for screwing-out, one takes the difference between the screwing-in and screwing-out force for each position and divides it by a factor proportional to the pitch of the mounting element so as to obtain a list of values representing for each of the positions the traction force to which the mounting element is subjected;

the compression force exerted by the mounting element, or the tension force in the mounting element, these steps being followed by either the action of rescrewing-in of the mounting element to a position whose measured force value is equal to the force necessary for the assembly, or the action of rescrewing-in the mounting element to a screwing-in force corresponding to the position at which one measured a force value equal to the force necessary for the assembly.

This action of rescrewing-in can be modified with respect to the position chosen and to the value of the force in order to anticipate the inertia of the motor means used. This modification can be a constant held in memory and corresponding to a predetermined rotation force or deducted from the stop phases of said means when one samples different force values of rotation of the mounting element.

This action of rescrewing-in can be corrected with respect to the position chosen and to the value of force in order to integrate the torque of the motor means mainly when the position detector is not fixed to the mounting element or to the coupling member. This correction can be taken from a correction table held in memory and deducted from the torque curve, that is from the relationship of the rotation force and the effective position.

The agreement of the positions of screwing-in and screwing-out can be done by correlating the position of maximum screwing-in force with the position of maximum screwing-out force while abstracting in this case the idea of a torque curve.

The actions of screwing in in order to obtain, at regular intervals of the value of the rotation force determined by the desired precision, the successive positions of the mounting element then of screwing out in order to obtain, at regular intervals for the same values, the successive positions of the mounting element, allows interpolating between values.

The fact of establishing a function relative to the rotation force with respect to the position of the mounting element, instead of establishing a list of values mainly when the control is done by a calculator, a processor, or a microcontroller in order to resolve by calculation the position or the rotation force necessary for the assembly, belongs to the same type of execution.

Nondestructive control of the assembly is done by using a manual, mechanical, pneumatic, hydraulic, or electric motor means capable via a coupling member connected to the threaded mounting element of insuring a controlled rotation force and detection of the actual angular position of the mounting element. With the mounting element that is already tightened one screws out the mounting element while at regular intervals spaced according to the desired precision and corresponding to respective angular positions one ascertains the force applied and then one retightens the mounting element while at the same positions one determines the force applied for screwing-out, one takes the difference between the screwing-out and rescrewing-in force for each position and divides it by a factor proportional to the pitch of the mounting element so as to obtain a list of values representing for each of the positions either the traction force to which the mounting element is subjected;

the compression force exerted by the mounting element, or the tension force in the mounting element.

This action of rescrewing-in can be modified with respect to the position chosen and to the value of the force in order to anticipate the inertia of the motor means used. This modification can be a constant held in memory and corresponding to a predetermined rotation force or deducted from the stop phases of said means when screws out.

This action of rescrewing-in can be corrected with respect to the position chosen and to the value of force in order to integrate the torque of the motor means mainly when the position detector is not fixed to the mounting element or to the coupling member. This correction can be taken from a correction table held in memory and deducted from the torque curve, that is from the relationship of the rotation force and the effective position.

When in the above the agreement of the positions of screwing-in/screwing-out or screwing-out/screwing-in does not work because of the torque of the motor used and the different deformations in the reaction chain of motor motor/housing/assembly, mainly when the position detector is not fixed on the mounting element or the coupling member relative to the assembly and because of the additive effect of play in the transmission with the rotation force, agreement of the positions of screwing-in/screwing-out is done by means of a "torque curve."

The position detector sees the position of the mounting element through an assembly which deforms proportionally to the rotation force applied by the motor means. So long as the resistant torque is not exceeded by the motor torque, the mounting element does not start rotating while the position detector records a displacement proportional to the applied torque. The effective position is masked by an apparent position due to the formation of the reaction chain. The torque curve is set up starting from the relationship of the value of the rotation force to the value of the observed position. The tangent to this curve is established by the variation of the value of the rotation effort relative to the variation of the value of position. The sudden change of the directing factor of the tangent to this curve, when the mounting element actually rotates, gives the precise position when the actual rotation starts. The resisting torque of the mounting element is the result of different contacting surfaces, head or nut, stem, screwthread. The element is subjected permanently (when it is stressed) to torque due to the tensile force on the helicoid of its screwthread. The modification of the tensile force is effected essentially when the resisting torque created by the screwthread is overcome. Rotation of the entire mounting element only starts at the instant when the screwthread advances. There is thus a difference between the start of rotation of the head or of the nut and the actual rotation of the mounting element. This difference in action is effective as a supplemental torque or a partial detorqueing of the mounting element depending on whether it is being screwed in or out. This torque variation of the mounting element affects the value of the recorded position in particular when the length of the mounting element is large with respect to its cross section. This variation creates a difference in slope between screwing in and out.

An analysis of the curve by the control and/or monitoring system makes it possible to work with great finesse, according to the desired precision in correlating the actual positions between screwing in and out to synchronize them with the applied rotation forces, namely:

The above described "dynamic control" action establishes a list of values of rotation efforts as a function of position intervals. The relationship between the difference of a value V and a value V-1 on the corresponding position interval gives the directing factor of the curve at a given interval. The succession of differentiation of the values such as V+1 and V, V+2 and V+1 . . . V(n) and V(n−1) where n represents the row of value in the list, provides a list of directing factors that are used in the variation of their value:

to fix the starting point of the increase of rotation force (compensating for play) on the measured position by the sudden increase in the value of the directing factor;

to cancel out the sum of torsions for screwing-in/screwing-out while subtracting for each of these actions the value of the effective position relative to the value of the rotation force from the value of the measured position before the mounting element started rotation,, the effective position being obtained by the sudden decrease in the value of the directing factor;

to cancel out the sum of torsions of screwing-out/rescrewing-in while subtracting for each of these actions the value of the effective position relative to the value of the rotation force from the value of the measured position before the mounting element started rotation, this position value being calculated during rescrewing-in in the proportion of the applied rotation force, the effective position being obtained by the sudden decrease in the value of the directing factor;

for evaluating at any instant during the act of screwing-in/screwing-out or screwing-out/rescrewing-in the value of torque relative to the applied rotation force.

It is also possible according to the invention to carry out a "floating control" allowing by using a manual, mechanical, pneumatic, hydraulic, or electric motor means capable via a coupling member connected to the threaded mounting element of insuring a controlled rotation force, with the following succession of screwing-in and -out actions:

screwing-in with a rotation force formed by a variable value and a fixed "delta" value;

subsequently screwing-out by a value equal at most to the variable value, the screwing-out being able to be partial;

repeating the action of screwing-in/screwing-out while increasing the variable value as long as screwing-out is possible, the progression of this variable value being able to be equal to the difference between this variable value and the value realized during screwing-out or a fraction of this difference so as to moderate the action while insuring a rapid convergence of this action toward a condition of it being impossible to screw out;

the "delta" force value multiplied by a factor proportional to the pitch of the screwthread of the mounting element representing either:

the traction force to which the mounting element is subjected;

the compression force exerted by the mounting element, or the tension force in the mounting element where, when the motor means is provided with a torque meter, the direct relationship of this rotation-force value is expressed as follows:

$$\delta C = FT \cdot K \text{ where } K = P/\pi$$

wherein:

$\delta C$=*"delta" torque in Newton-meters*

Ft=tensile force in Newtons $\pi$=circle constant

P=pitch of the screwthread in meters where, when the energy consumption of the motor means is monitored the direct relationship of this rotation-force value is expressed as follows:

$$\delta E' = Ft \cdot K \text{ where } K = P/\tau$$

wherein:

$\delta E'$=a factor representing energy

Ft=tensile force in Newtons $\tau$=a constant including the circle constant $\pi$ times the efficiency of the motor in converting energy P=pitch of the screwthread in meters The element representing energy can be any element giving the image of the torque of the motor means (current, voltage, pressure, etc.) multiplied by a constant or function f(x), but also the torque of a mechanical means using the flexion or the torsion of an element for which the conversion is not generally a constant but can also be a function (x).

The motor means can only be monitored in one way or differentially. The monitoring of the absolute rotation force is not indispensable.

Finally the process according to the invention allows one to study the coefficients of friction and the general efficiency of the mounting element in the assembly:

Through the principle of the invention and dynamic control one establishes a precise relationship between the torque applied on screwing in or out and the tension that exists in the mounting element. This tension allows one at any time to calculate the torque effective converted to produce this same tension. The relationship of this converted torque to the applied torque fixes the efficiency of the mounting element.

Ctfr=(Ft·$\pi$)/2P torque converted $\mu$=Ctfr/Capp general efficiency on screwing-in $\mu'$=Ctfr/Capp general efficiency on screwing-out cs=1/$\mu'$ safety coefficient The efficiency of the mounting element is the resultant of the frictions of the different contacting surfaces, heat or nut, stem, screwthread. Their distribution is unknown. The usage of the "torque curve" allows each of the torques caused by friction of the contacting parts to be isolated by different rotations of each part of the mounting element seen by the torque curve.

Capp=Ctfr+Ctt+Cflt+Ctg general distribution of screwing in

CappO=Ctfr+Ctt screwing in (rest limit)

–CappO'=Ctfr–Ctt screwing out (rest limit)

Ctt=(CappO+CappO')/2-Ctfr head friction torque

Cappl=Ctfr+Ctt+Cflt+Ctg screwing in (screwthread rotation)

–Cappl'=Ctfr+Ctt+Cflt–Ctg screwing out (screwthread rotation)

cflt=((Cappl+Cappl')/2–Ctt screwthread friction torque with negligible stem friction Cflt=((Cappl+Cappl')/2–Ctt–Ctg screwthread friction torque with high stem friction at high tension In the study of friction coefficients when the measurement of the change in positions is not sufficiently demarcated (the case with short screws) extra weight is given in the equations of friction to the torque caused by friction of the screwthread without changing its value by the introduction under the head or nut of an intermediate element, such as an abutment bearing or other element with known or minimal coefficient.

From the current relationship :$\mu n=Cx/[Ft\cdot(dI+d2)]$ for bodies of revolution, one deducts the coefficient of friction starting with the distribution of torques for each torque Cs as a function of the tension Ft and of the geometry of the mounting element wherein in this relationship μn=coefficient of friction Cx=friction torque (Ctt, Cflt, etc.)

Ft=tension force of the method dI=inside diameter of the contacting surface d2=outside diameter of the contacting surface

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
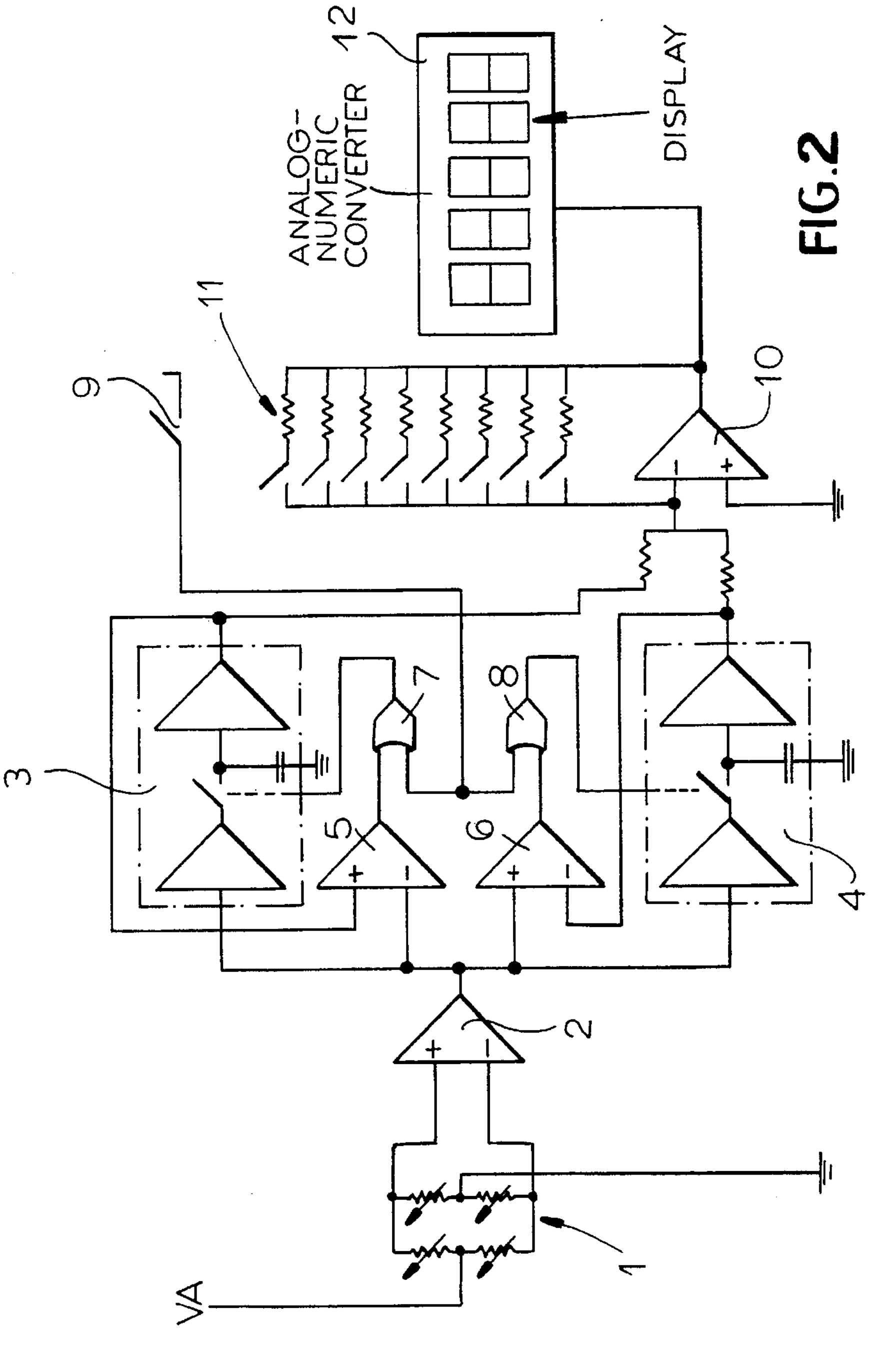
FIG. 2 is a diagram of the electrical and electronic circuits of the torque wrench of FIG. 1.
Figure 1:
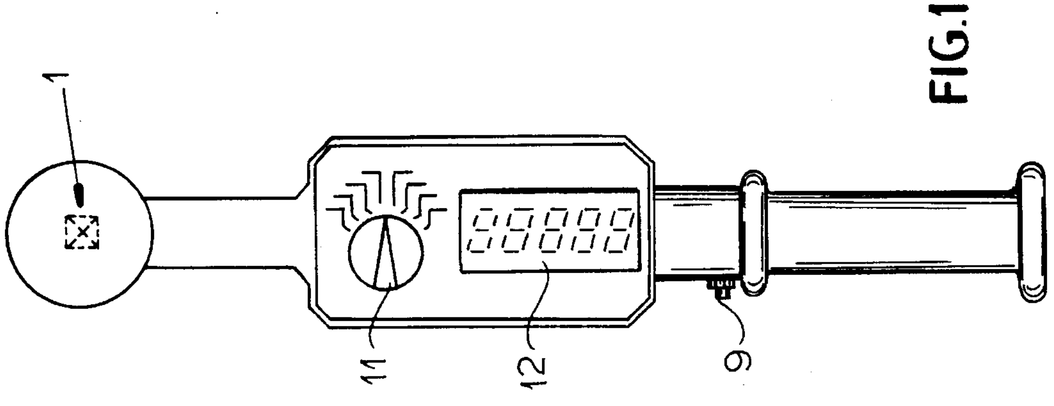
FIG. 1 shows a torque wrench for screw-tightening with monitoring of the tension by the method of the invention.

FIG. 1 shows the outside of a torque wrench for screw tightening with monitoring of the tension, the internal electrical and electronic circuits being shown by the schematic of FIG. 2 in which, for clarity of view, certain particular components not essential to comprehension such as the battery supply needed to ensure the portability and independence of this torque wrench are not shown.

In the example shown here, there is a torque wrench of a capacity of 300 Nm in which a strain-gauge torque meter 1 is fed a feed voltage VA of 10 v and produces a voltage proportional to the torque applied. A first amplifier 2 of a gain of 1000 produces at its output a voltage of –/+33.333 mV for each 1 Nm of torque depending on the direction of screw tightening. The output of the amplifier 2 is connected to the inputs of two sampler/blockers 3 and 4 as well as to the inputs of two comparators 5 and 6. The first set formed by the sampler/blocker 3 and the comparator 5 insures memorization of the screwing-in torque to the right which produces a negative signal since the comparator 5 compares the output of the sampler/blocker 3 with its input and when the input is greater than the output this comparator 5 sets the sampler/blocker to blocking by means of an OR gate 7, thus memorizing the highest value of the right-hand torque that is measured. The second set formed by the sampler/blocker 4 and the comparator 6 insures memorization of the torque to the left which produces a negative signal since the comparator 6 compares the output of the sampler/blocker 4 with its input and when the input is greater than the output this comparator 6 sets the sampler/blocker to blocking by means of an OR gate 8, thus memorizing the highest value of the left-hand torque that is measured. The outputs of each comparator 5 and 6 are connected to the respective OR gates 7 and 8 having in common an input coupled to a push-button 9 allowing the right-hand and left-hand torques that have been recorded to be reset to zero. The outputs of the sampler/blockers 3 and 4 are connected to the input of an amplifier 10 hooked up as an adder so that its gain is only applied to the difference of the outputs of the sampler/blockers 3 and 4 in that one is negative and the other is positive; the algebraic sum is actually a subtraction. The amplifier 10 produces a gain proportional to the pitch of the screw chosen by a selector 11 which provides a choice of different screw pitches in a range of torques applied by the wrench. The selector 11 sets a range of gain by connection of a resistor appropriate for the gain loop of the amplifier 10. The output of the amplifier 10 is connected to the input of an analog/numeric converter 12 driving a numeric display as a function of the voltage. The numeric display is set from 0 to +/–199.99, a scale which reads directly as kN (kiloNewtons) for voltages from 0 to +/–5 volt.

Figure 3:
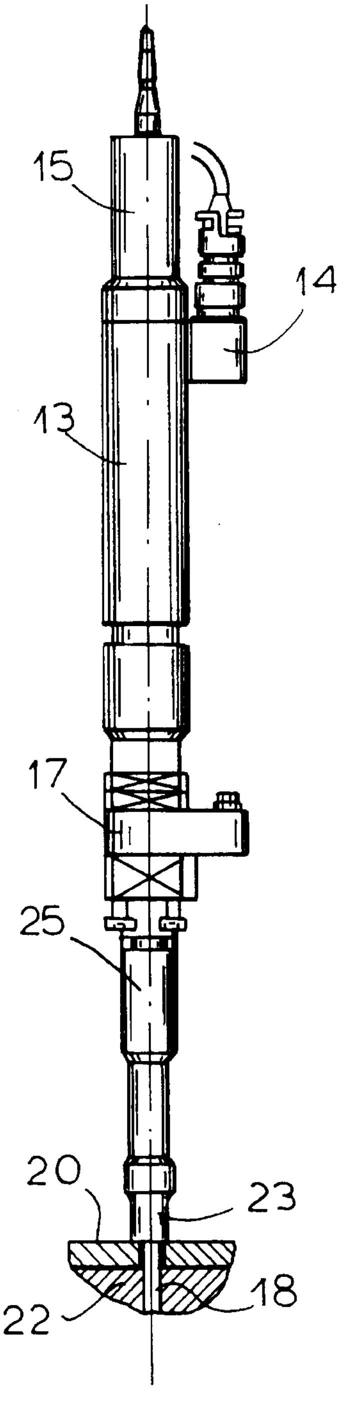
FIG. 3 shows a power spindle for screw-tightening using the method according to the present invention.
Figure 4:
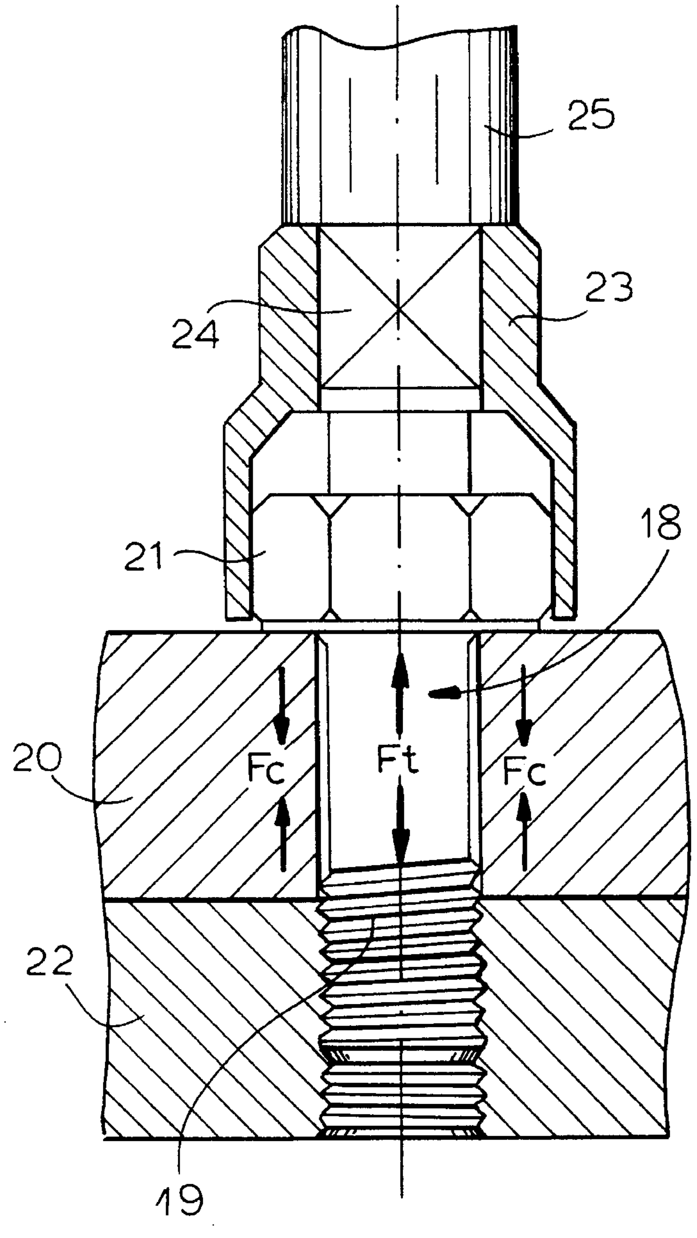
FIG. 4 is a view of a detail of the screw assembly made by the power spindle of FIG. 3.
Figure 5:
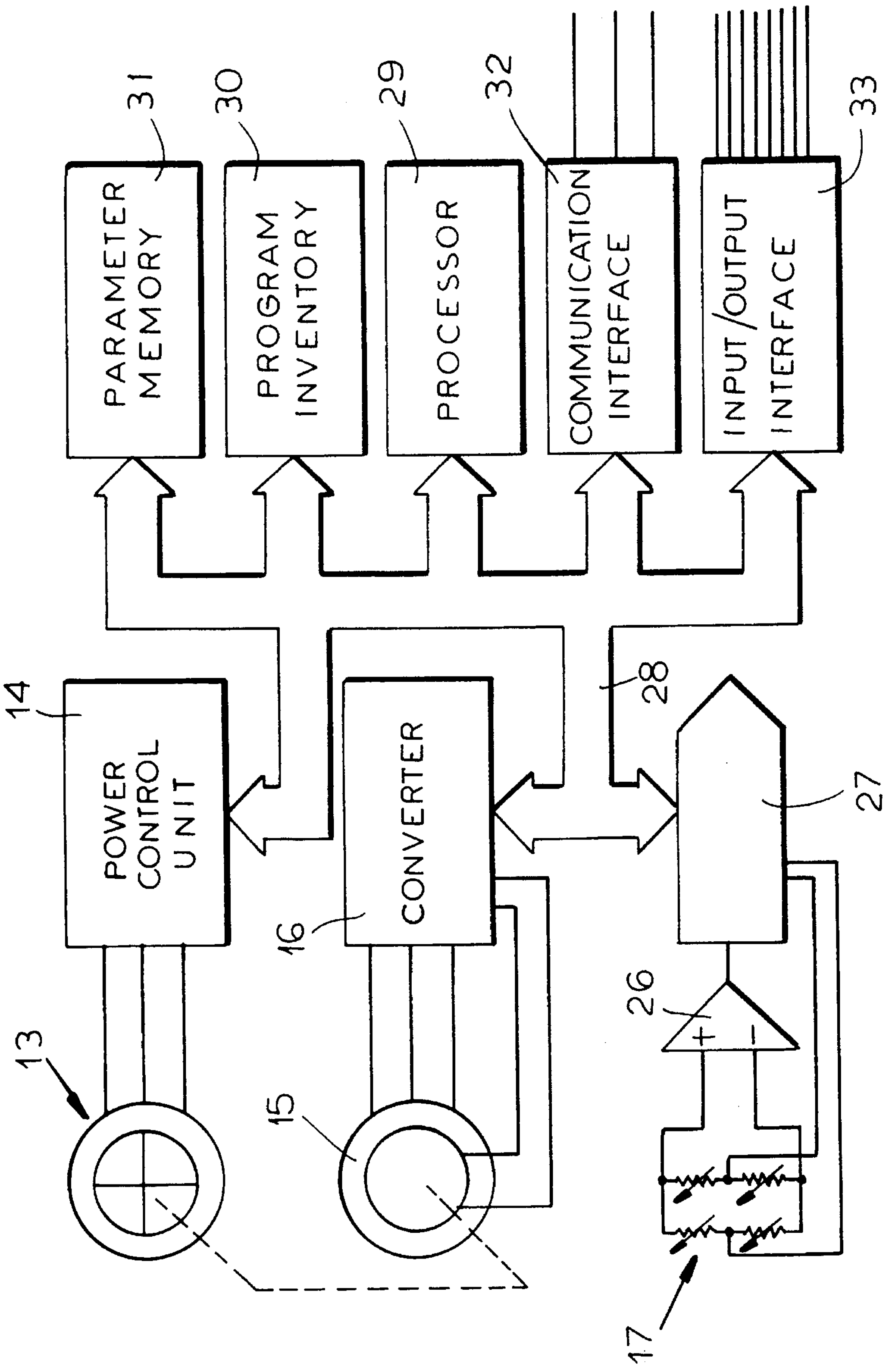
FIG. 5 is a diagram of the control of the power screwing spindle of FIG. 3.

FIGS. 3 to 5 show a screwing-in power spindle controlled by a processor for carrying out the invention. A brushless motor 13 is fed by a power control unit 14 which regulates the phase or frequency, the voltage, and the current and thus controls the speed of the rotor of the motor 13 with respect to direction and power. The information about position of the rotor is supplied by a synchroresolver 15 fixed on the motor shaft of the rotor. The position of the synchroresolver 15 determined by the sine/cosine phase offset is converted into numeric data by a converter 16. The converter 16 which can work with different levels of precision (10, 12, 14 or 16 bits) is controlled to supply 12 bits of precision with one revolution of the synchroresolver, that is a definition of 1/4096 revolution or 5.27 minutes of arc. A strain-gauge torque meter 17 secured to the mount of the power spindle measures the effective torque applied to a mounting element 18 such as a screw of an assembly having a screwthread 19 and compressing a part 20 between a head 21 of the screw and a part 22 serving as nut. Rotation of the mounting element 18 is effected by a coupling member 23 such as a socket which fits over the head 21 of the mounting element 18 and which is entrained by a square head of an axle of the spindle formed by the motor arbor. The compressive forces Fc of the part 20 are balanced by the tension Ft of the mounting element 18. The signal from the torque meter 17 is amplified by an instrumentation amplifier 26 whose output is connected to the input of an analog/numeric converter 27 which has 11 bits of bipolar resolution, for this torque meter 17 at a nominal 500 Newton-meter a definition of 500/2048 or 0.244 Nm/bit. The numeric data of the converters 27 and 16 pass along a bus 28 and are fed to a processor 29 which acts on them according to a program in memory 30 and stores this numeric data in a memory 31. The processor 29 operates the power-control module 14 for the cycles necessary for screwing-in/screwing-out/rescrewing-in. The memory 31 mainly holds the parameters of the screwing-in operation such as the desired tension, maximum torque applicable to the mounting element, pitch of the mounting element, rotation speed of the motor 13, etc. These parameters are inputted on a communication interface module 32 by means of a terminal or network. The memory 31 also holds the measurements effected during screwing-in and screwing-out as a table (list of values) as well as the results of the calculations allowing the control of the motor for increasing the tension and the final results produced by the communication interface 32 going to a terminal and/or to a printer. An input/output interface 33 allows control by an operator or automatic machine so that, with respect to input, the cycle can be started, stopped in an emergency, etc. and with respect to output provides a display, visual output, etc.

During screwing-in the processor 29 reads the position of the rotor and attaches to each position the numeric value of the torque applied by the spindle according to a table held in the memory 31, dimensioned for example at 16,384 values (4 revolutions of the rotor) then restarts the operation each time the value reaches the torque determined by the parameters. The processor thus creates in the table a first list of a succession of values of screwing-in torque. The processor repeats the same operations for screwing-out for the same positions in the opposite direction creating a second list of a succession of torque values for screwing-out. Then the processor, working position by position for the same positions in each list, subtracts the torque value in the second list from the respective torque value of the first list, thus creating a third list consisting of the differences between the screwing-in and screwing-out torques for the same positions. Applying the above-described formula as a function of the pitch of the screw 13 the processor 29 calculates, position by position, the tension in the screw. Then the calculated tension is compared with the desired tension and it retightens to the desired position. The treatment algorithm is much advanced by a first calculation of the desired tension translated as an offset from the desired torque, avoiding the comparison using the third list and by limiting the number of comparisons to the first concordance to thus reduce the travel of the program. The treatment speed of modern processors (several million instructions per second) makes the electronic time insignificant with respect to the mechanical time. In effect the treatment time for controlling the tension is simply masked by the mechanical time for effective reversing of the rotation of the motor.

As can be seen, the invention is not only limited to the application of this method of monitoring and controlling the tension or compression of a threaded element as described above by way of example. On the contrary it includes all the variants of application using the same principle in order to determine a value of force or the control of a value of force representing either a tractive force exerted by a mounting element, a compressive force exerted by a mounting element, or a residual tensile force in a mounting element. The invention includes therefore all the application variants aimed at a common goal and using the same principle and it is therefore important that the method that it relates to can be extended to a threaded element serving to convert a rotary movement into a linear movement or the opposite conversion of a linear movement into a rotary movement with force transmission, in particular in devices for weighing, lifting, or compressing.

We claim:

1. A method of monitoring and controlling axial force applied to a pair of relatively rotatable elements interconnected by a screwthread, said method comprising the steps of:

(a) obtaining a value of a screwing-in torque and a value of a screwing-out torque by rotation of one of said elements relative to another of said elements by one of the following procedures:

($a_1$) automatically measuring a static screwing-in torque at a start of a screwing-in process of said one of said elements from a rest position and measuring a static screwing-out torque at a start of a screwing-out process of said one of said elements from a rest position, ($a_2$) dynamically measuring automatically during rotation of said one of said elements and during screwing in and screwing out at each of a succession of corresponding positions of said one of said elements during a single screwing-in and screwing-out operation, respective screwing-in and screwing out torques, ($a_3$) dynamically measuring automatically during rotation of said one of said elements and during screwing in and screwing out at each of a succession of corresponding positions of said one of said elements during a plurality of iteratively repeated screwing-in and screwing-out operations, respective screwing-in and screwing out torques, and ($a_4$) dynamically measuring automatically during rotation of said one of said elements and during a process of screwing in, screwing out and screwing in of said one of said elements at each of a succession of corresponding positions of said one of said elements, respective screwing-in and screwing-out torques;

(b) automatically subtracting a respective measured screwing-in torque from a respective screwing-out torque to obtain a difference; and (c) automatically dividing said difference by a coefficient proportional to a pitch of said screwthread to obtain an output representing axial force on said a pair of relatively rotatable elements resulting from rotation of said one of said elements relative to the other of said elements.

2. The method according to claim 1 wherein a motor means via a coupling member is connected to said one of said elements which forms a threaded mounting element and applies a controlled force for rotating this mounting element, the method comprising:

taking at a rest limit of sliding of a movable part of the mounting element on a fixed part of an assembly formed by the elements, a value of a force of rotation during screwing-out, then taking at a rest limit of sliding of the movable part of the mounting element on the fixed part of the assembly a force value of the rotation force as it passes a maximum during screwing-out, then finding the difference between said two force values for dividing them by a factor proportional to the pitch of the screwthread of the mounting element so as to obtain a value representing one of the following forces:

a tractive force applied to at least a tensioned one of said elements, a compressive force applied to a compressed one of said elements, and a tension force within one of said elements.

3. The method according to claim 1 wherein a motor means via a coupling member is connected to said one of said elements which forms a threaded mounting element and applies a controlled force for rotating this mounting element, the threaded mounting element having been previously screwed in, the method comprising:

taking at the rest limit of sliding of the movable part of the mounting element on the fixed part of the assembly the value of the force of rotation during screwing-out then taking at the rest limit of sliding of the movable part of the mounting element on the fixed part of the assembly the value of the rotation force as it passes its maximum during screwing-out, then finding the difference between these two force values for dividing them by a factor mainly proportional to the pitch of the screwthread of the mounting element so as to obtain a value representing these precise limits either:

the tractive force applied to the mounting element, the compressive force exercised by the mounting element, or the tensile force inside the mounting element at the start of the operation.

4. The method according to claim 3 for nondestructively monitoring a screwed-together assembly wherein tension is measured and the measurement of is followed by the action of rescrewing-in up to the force first used, to one of a rest limit, and a start of sliding in order to restore initial conditions of the assembly while having monitored the force in the mounting element to which the mounting element is subject.

5. The method according to claim 4, wherein control is carried out by successive approximations on a mounting element that is already stressed by exerting the above-defined action a number of times until a ratio of a repaired tensile force to an existing tensile force is equal to 1, the value of a screwing-in and screwing-out force being able to be modified by a factor able to assure convergence of the action toward a required tension.

6. The method according to claim 1 for dynamic control using a motor means capable via a coupling member connected to a threaded mounting element forming said one of said elements and providing controlled rotation force and detection of the actual angular position of the mounting element, the method comprising with the mounting element not tightened, tightening the mounting element while at regular intervals corresponding to respective angular positions the force applied is ascertained, then loosening the mounting element while at the same positions determining a force applied for screwing-out force being taken for each position and divided by a factor proportional to the pitch of the mounting element so as to obtain a list of values representing for each of the positions one of the following forces:

a tractive force applied to at least a tensioned one of said elements, a compressive force applied to a compressed one of said elements, and a tension force within one of said elements, these steps being followed by one of the steps of:

rescrewing-in the mounting element to a position whose measured force value is equal to a force necessary for assembly, and rescrewing-in the mounting element to a screwing-in force corresponding to the position at a force value is measured equal to the force necessary for assembly.

7. The method according to claim 1 for monitoring by using a motor means capable via a coupling member connected to a threaded mounting element forming said one of said elements generating a controlled rotation force and detection of the actual angular position of the mounting element, the method comprising with the mounting element already tightened, screwing out the mounting element while at regular intervals spaced corresponding to respective angular positions ascertaining the force applied, and then retightening the mounting element while at the same positions determining a force applied for screwing-out, the difference between the screwing-out and rescrewing-in force for each position being taken by a factor proportional to the pitch of the mounting element so as to obtain a list of values representing for each of the positions one of the following forces:

a tractive force applied to at least a tensioned one of said elements, a compressire force applied to a compressed one of said elements, and a tension force within one of said elements.

8. The method according to claim 7 wherein in order to account for torsion of the motor means and other deformations, a list of values of rotation forces is provided as functions of position intervals which form a list of directing factors that are used in variation of their values:

to fix a starting point of an increase of rotation force on a measured position by a sudden increase in the value of the directing factor;

to cancel out a sum of torsions for screwing-in/screwing-out while subtracting for each of these actions a value of an effective position relative to a value of a rotation force from a value of the measured position before the mounting element started rotation, the effective position being obtained by a sudden decrease in the value of the directing factor;

to cancel out a sum of torsions of screwing-out/rescrewing-in while subtracting for each of these actions a value of the effective position relative to the value of the rotation force from the value of the measured position before the mounting element started rotation, this position value being calculated during rescrewing-in in the proportion of an applied rotation force, the effective position being obtained by the sudden decrease in the value of the directing factor; and for evaluating at any instant during the act of screwing-in/screwing-out or screwing-out/rescrewing-in a value of torque relative to the applied rotation force.

9. The method according to claim 1 for carrying out "floating control" by using a motor means capable via a coupling member connected to a threaded mounting element forming said one of said elements and insuring a controlled rotation force, the method comprising the following succession of actions:

screwing-in with a rotation force formed by a variable value and a fixed delta value;

subsequently screwing-out by a value equal at most to the variable value, the screwing-out being able to be partial;

repeating the action of screwing-in/screwing-out while increasing the variable value as long as screwing-out is possible, the progression of this variable value being able to be equal to the difference between this variable value and the value realized during screwing-out or a fraction of this difference so as to moderate the action while insuring a rapid convergence of this action toward a condition of it being impossible to screw out;

the delta force value multiplied by a factor proportional to the pitch of the screwthread of the mounting element representing one of the following forces:

a tractive force applied to at least a tensioned one of said elements, a compressive force applied to a compressed one of said elements, and a tension force within one of said elements.

* * * * *